United States Patent
Song et al.

(10) Patent No.: US 11,437,610 B2
(45) Date of Patent: Sep. 6, 2022

(54) HIGH CAPACITY SECONDARY BATTERY

(71) Applicant: UNIST(ULSAN NATIONAL INSTITUTE OF SCIENCE AND TECHNOLOGY), Ulsan (KR)

(72) Inventors: Hyun-Kon Song, Ulsan (KR); Nam-Soon Choi, Ulsan (KR); Chihyun Hwang, Ulsan (KR); Jung-Gu Han, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 278 days.

(21) Appl. No.: 16/862,727

(22) Filed: Apr. 30, 2020

(65) Prior Publication Data
US 2020/0350556 A1  Nov. 5, 2020

(30) Foreign Application Priority Data

May 3, 2019 (KR) .................. 10-2019-0052275
Mar. 13, 2020 (KR) .................. 10-2020-0031339

(51) Int. Cl.
*H01M 4/131* (2010.01)
*H01M 4/58* (2010.01)
*H01M 4/525* (2010.01)
*H01M 10/0525* (2010.01)
*H01M 4/02* (2006.01)

(52) U.S. Cl.
CPC .......... *H01M 4/131* (2013.01); *H01M 4/525* (2013.01); *H01M 4/58* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 2006/0263695 A1* | 11/2006 | Dahn ............... | H01M 10/0567 29/623.1 |
| 2012/0148924 A1* | 6/2012 | Ogino ............... | H01M 10/0568 429/207 |
| 2013/0062575 A1 | 3/2013 | Wietelmann | |

(Continued)

FOREIGN PATENT DOCUMENTS

KR  10-2014-0031018  3/2014
KR  10-2016-0034516  3/2016

(Continued)

OTHER PUBLICATIONS

C. Park, E. Lee, S. H. Kim, J.-G. Han, C. Hwang, S. H. Joo, K. Baek, S. J. Kang, S. K. Kwak, H.-K Song, N.-S. Choi. Malonic-acid-functionalized fullerene enables the interfacial stabilization of Ni-rich cathodes in lithium-ion batteries, Journal of Power Sources 521 (2022) 230923.*

(Continued)

*Primary Examiner* — Carlos Barcena
(74) *Attorney, Agent, or Firm* — Lex IP Meister, PLLC

(57) ABSTRACT

Provided are a high-capacity secondary battery including a cathode including an over-lithiated oxide cathode material or a Ni-rich cathode material; a lithium anode (Li anode); and an electrolyte including a superoxide dismutase mimic catalyst (SODm).

9 Claims, 8 Drawing Sheets

(56) References Cited

U.S. PATENT DOCUMENTS

2016/0093917 A1* 3/2016 Veith ................. H01M 10/4235
429/188

FOREIGN PATENT DOCUMENTS

KR    10-2017-0107345    9/2017
KR    10-2018-0027260    3/2018

OTHER PUBLICATIONS

Chihyun Hwang et al., "Biomimetic Superoxide Disproportionation Catalyst for Anti-Aging Lithium-Oxygen Batteries", ACS Nano 2019, 13, 8, 9190-9197, Jun. 18, 2019. DOI: 10.1021/acsnano.9b03525.
Jung-Gu Han et al., "An Antiaging Electrolyte Additive for High-Energy-Density Lithium-Ion Batteries", Adv. Energy Mater. 2020, 2000563, Apr. 6, 2020. DOI: 10.1002/aenm.202000563.
Jonghak Kim et al., "A Chemically and Electrochemically Bifunctional Mobile Catalyst for Anti-aging Lithium-Oxygen Batteries", UNIST. (PowerPoint presentation).
Atetegeb Meazah Haregewoin et al., "Electrolyte additives for lithium ion battery electrodes: progress and perspectives", Energy Environ. Sci., 2016, 9, 1955-1988.
Daxian Zuo et al., "Recent progress in surface coating of cathode materials for lithium ion secondary batteries", Journal of Alloys and Compounds, 706, 24-40.
Yuri Surace, "Manganese-based cathode materials for Li-ion batteries", 2015, University of Stuttgart.
Qi Dong et al., "Catalysts in metal-air batteries", MRS Communications, 8(02), 372-386.

* cited by examiner (a)

(b)

HIGH CAPACITY SECONDARY BATTERY

This application claims priority to and the benefit of Korean Patent Application No. 10-2019-0052275 filed in the Korean Intellectual Property Office on May 3, 2019 and Korean Patent Application No. 10-2020-0031339 filed in the Korean Intellectual Property Office on Mar. 13, 2020, the entire contents of which are incorporated herein by reference.

BACKGROUND OF THE INVENTION

(a) Field of the Invention

This is related to a high-capacity secondary battery.

(b) Description of the Related Art

A lithium ion battery is a secondary battery having a structure in which lithium ions are released from a cathode as ions during charging and move to an anode, while lithium ions are returned from the anode to the cathode during discharging, and its high energy density is known to be caused by the potential of cathode materials.

As a cathode active material of a lithium ion battery, lithium metal composite oxides such as $LiCoO_2$, $LiNiO_2$, and $LiMnO_2$ having a layered structure are known, in addition to lithium manganese oxide ($LiMn_2O_4$) having a spinel structure. For example, $LiCoO_2$ has a layered structure in which a lithium atomic layer and a cobalt atomic layer are alternately superposed through an oxygen atomic layer, has a large charge and discharge capacity, and has excellent diffusibility of lithium ions through intercalation-deintercalation. Most of the ion cells use lithium metal composite oxides having a layer structure such as $LiCoO_2$.

As the lithium metal composite oxides having such a layered structure, $LiCoO_2$ is currently mainly used, but since Co is expensive, recently, a layered lithium metal composite oxide in which Li is excessively added to reduce a content of Co (also referred to as "OLO") is attracting attention, and development of a cathode active material using inexpensive Ni (nickel) or Mn (manganese) is in progress.

While the cathode active material using Ni (nickel) is suitable for use in a battery for high capacity and high voltage, the structure is unstable and capacity deterioration occurs, and there is a problem in that thermal stability is vulnerable due to reaction with an electrolytic solution. The cathode active material using a layered lithium metal composite oxide has a problem in that by-products are generated as charging and discharging progress, and the by-products cover the exterior of the layered structure to significantly reduce the capacity of the battery.

SUMMARY OF THE INVENTION

The present invention provides a high-capacity secondary battery with improved charge and discharge characteristics by suppressing generation of by-products as charging and discharging progress.

An embodiment of the present invention provides a high-capacity secondary battery including a cathode including an over-lithiated oxide cathode material or a Ni-rich cathode material, a lithium (Li) anode, and an electrolyte including a superoxide dismutase mimic catalyst (SODm).

The superoxide dismutase mimic catalyst may serve to convert a superoxide ($O_2^{\bullet-}$) that is generated as the cathode is activated upon charging into $Li_2O_2$.

The superoxide dismutase mimic catalyst may serve to suppress side reactions of the superoxide ($O_2^{\bullet-}$) that are generated as the cathode is activated upon charging.

The superoxide dismutase mimic catalyst may serve to inhibit production of at least one side-reaction product selected from $Li_2O_3$, $LiOH$, $LiF$, $CO_2$, $C_2O_6^{2-}$, $H_2O$, $O_2$, and CO upon charging.

The high-capacity secondary battery may further include a $Li_2O_2$ film formed at an interface between the cathode and the electrolyte.

The $Li_2O_2$ film may serve to inhibit a transition metal generated from the cathode from being dissolved in the electrolyte.

The $Li_2O_2$ film may serve to inhibit the superoxide ($O_2^{\bullet-}$) generated as the cathode is activated from being dissolved in the electrolyte.

The superoxide dismutase mimic catalyst (SODm) may be at least one of an organic compound, a free radical compound, a metal complex, and a metal oxide which include at least one functional group of a carboxyl group, a polyphenol group, and a hydroxyl group.

The SODm (superoxide dismutase mimic catalyst) may be, for example, at least one selected from MA-$C_{60}$ (malonic-acid functionalized fullerene), 4-carboxy-TEMPO, honokiol, $CeO_2$, $OsO_4$, Mn texaphyrin, MnTrM-2-Corrole$^{3+}$ (5,10,15-tris-(1-methylpyridinium-2-yl)corrole manganese complex), [MnBV$^{2-}$]$_2$ (manganese(III) biliverdin IX), [MnBVDME]$_2$ (manganese(III) biliverdin IX dimethyl ester), [MnMBVDME]$_2$ (manganese(III) mesobiliverdin IX dimethyl ester), and [MnBVDT$^{2-}$]$_2$ (manganese(III) biliverdin IX ditaurate).

The SODm may be included in an amount of 0.1 wt % to 1 wt % based on a total weight of the electrolyte.

As the charging and discharging progresses, generation of by-products may be suppressed, thereby realizing a high-capacity secondary battery with improved charging and discharging characteristics.

DETAILED DESCRIPTION OF THE EMBODIMENTS

Figure 1:
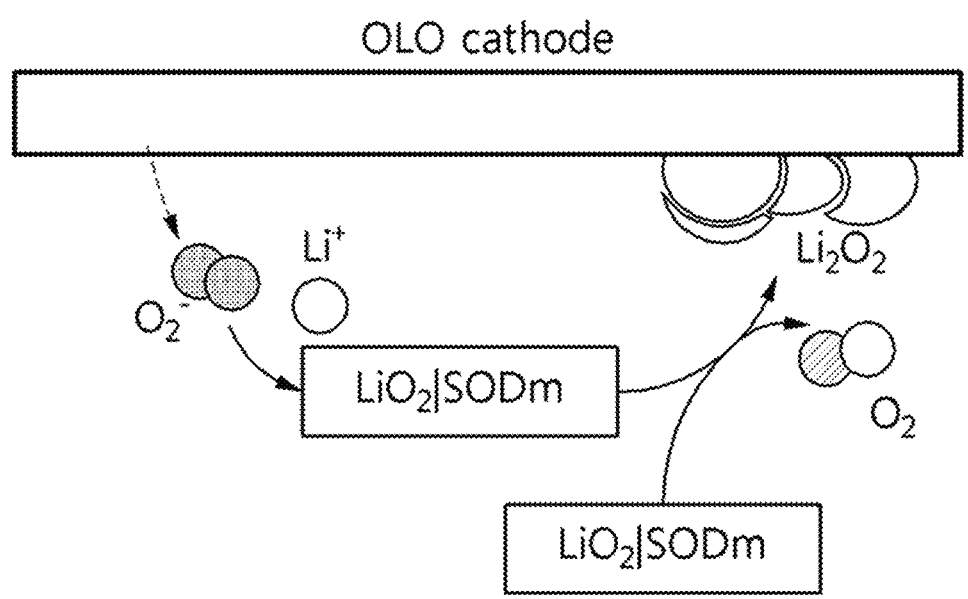
FIG. 1 is a view for explaining the process of forming a $Li_2O_2$ film of a high-capacity secondary battery according to an embodiment of the present invention.

Hereinafter, embodiments of the present invention are described in detail. However, these embodiments are exemplary, the present invention is not limited thereto, and the present invention is defined by the scope of claims.

The same reference numerals shown in each drawing denote the same members.

Throughout the specification, when one member is disposed "on" another member, this includes not only the case where one member contacts another member, but also the case where another member is present between the two members.

Throughout the specification, when a portion "includes" a certain element, this means that other elements may be further included instead of excluding other elements.

Hereinafter, a high-capacity secondary battery according to an embodiment is described.

A high-capacity secondary battery according to an embodiment of the present invention includes: a cathode including an over-lithiated oxide cathode material or a Ni-rich cathode material; a lithium anode (Li anode); and an electrolyte.

In an embodiment, the electrolyte includes a superoxide dismutase mimic catalyst (SODm).

The superoxide dismutase (SOD) is an enzyme that prevents cells from being damaged by a superoxide, which is the most common free radical in the human body, and among these SODs, species applied to the electrolyte for batteries to function as a catalyst are defined as a superoxide dismutase mimic catalyst (SODm). Hereinafter, it is abbreviated as SODm.

The electrolyte of the high-capacity secondary battery includes the SODm and thus may control a side reaction of a superoxide, which is a free radical generated as the cathode material of the high-capacity secondary battery is activated, suppress a transition metal generated from the cathode material from being dissolved in the electrolyte, and thus greatly improve charge and discharge characteristics.

Specifically, as the cathode material of the high-capacity secondary battery is activated, the superoxide ($O_2^{\bullet-}$), which is the free radical, is generated, for example, as a $Li_2MnO_3$ cathode material, one of the OLO cathode materials is electrochemically activated at a voltage of 4.4 V to 4.8 V, and oxygen is generated according to Chemical Formula 1.

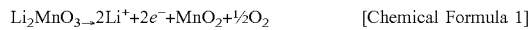

$Li_2MnO_3 \rightarrow 2Li^+ + 2e^- + MnO_2 + \frac{1}{2}O_2$     [Chemical Formula 1]

Herein, the oxygen may be generated as a superoxide ($O_2^{\bullet-}$) and thus produces various side-reaction products, and for example, it reacts with lithium ions and thus forms by-products such as $Li_2O$, $Li_2CO_3$, and the like according to Chemical Formula 2, and these by-products bring about capacity deterioration of the secondary battery.

$2Li^+ + \frac{1}{2}O_2 \rightarrow Li_2O$

$Li_2O + CO_2 \rightarrow Li_2CO_3$     [Chemical Formula 2]

According to one aspect, the SODm may serve as a catalyst for converting a superoxide ($O_2^{\bullet-}$) generated as the cathode is activated into $Li_2O_2$ upon charging.

According to one aspect, the SODm may serve to suppress side reactions of the superoxide ($O_2^{\bullet-}$) that is generated as the cathode is activated upon charging.

According to one aspect, the SODm may serve to inhibit production of at least one side-reaction product selected from $Li_2CO_3$, LiOH, LiF, $CO_2$, $C_2O_6^{2-}$, $H_2O$, $O_2$, and CO upon charging. However, the SODm is not limited thereto, and may suppress any side reactions product possibly generated during the battery charge.

In other words, when the electrolyte of a high-capacity secondary battery according to the the present invention includes the SODm, the aforementioned by-products may be suppressed from being formed. The SODm may react with the superoxide ($O_2^{\bullet-}$) generated as the cathode material is activated and play a role of promoting formation of $Li_2O_2$ in the electrolyte, wherein the generated $Li_2O_2$ covers the surface of the cathode material. In other words, a $Li_2O_2$ film is formed at the interface between the cathode and the electrolyte.

According to one aspect, the $Li_2O_2$ film may be further included at the interface between the cathode and the electrolyte.

FIG. 1 is a view for explaining the process of forming a $Li_2O_2$ film of a high-capacity secondary battery according to an embodiment of the present invention.

Referring to FIG. 1, the SODm plays a role of forming $Li_2O_2$ at the interface of a cathode and an electrolyte through a disproportionation reaction of a superoxide ($O_2^{\bullet-}$) generated as a cathode material is activated.

According to one aspect, the $Li_2O_2$ film may serve to inhibit the superoxide ($O_2^{\bullet-}$) that is generated as the cathode is activated from being dissolved in the electrolyte. As described above, the superoxide ($O_2^{\bullet-}$) generated as the cathode is activated may promote formation of various side-reaction products and lead to capacity deterioration of a secondary battery. On the contrary, as for the high-capacity secondary battery manufactured by applying the SODm according to the present invention, the SODm may play a role of suppressing the superoxide ($O_2^{\bullet-}$) from being dissolved in the electrolyte through the $Li_2O_2$ film and thus realize a high-capacity secondary battery having excellent charge and discharge characteristics.

According to one aspect, the $Li_2O_2$ film may serve to inhibit a transition metal generated from the cathode from being dissolved in the electrolyte. In a conventional high-capacity secondary battery having no $Li_2O_2$ film, a transition metal of a cathode material such as Mn and the like may be dissolved in an electrolyte during the charge and then deposited in an anode, and thus deteriorates performance of the secondary battery. On the contrary, the high-capacity secondary battery including the SODm according to the present invention may suppress the transition metal generated from the cathode from being dissolved in the electrolyte through the $Li_2O_2$ film at the interface of the cathode and the electrolyte and thus realize excellent charge and discharge characteristics.

According to one aspect, the $Li_2O_2$ film may suppress formation of a spinel structure on the surface of the cathode according to charges and discharges. The conventional high-capacity secondary battery has a spinel structure formed on the surface of the cathode material having a layered structure according to the charges and discharges, and this structural change promotes dissolution of the transition metal such as Mn and the like in the electrolyte. On the contrary, as for the high-capacity secondary battery including the SODm according to the present invention, the $Li_2O_2$ film at the interface of the cathode and the electrolyte may suppress the formation of the spinel structure on the surface of the cathode according to the charges and discharges and thus realize excellent charge and discharge characteristics.

The SODm may be included in an amount of 0.1 wt % to 1 wt % based on a total weight of the electrolyte.

Since the SODm is included in the above-described range, charge-discharge cycle-life may be improved.

According to one aspect, the SODm applied to the electrolyte of the lithium secondary battery may be at least one of an organic compound including at least one functional group of a carboxyl group, a polyphenol group, and a hydroxyl group; a free radical compound including at least one functional group of a carboxyl group, a polyphenol group, and a hydroxyl group; a metal complex including at least one functional group of a carboxyl group, a polyphenol group, and a hydroxyl group; and a metal oxide including at least one functional group of a carboxyl group, a polyphenol group, and a hydroxyl group.

According to a specific aspect, the SODm applied to the electrolyte of the lithium secondary battery may include at least one selected from MA-$C_{60}$, 4-carboxy-TEMPO, honokiol, $CeO_2$, $OsO_4$, Mn texaphyrin, MnTrM-2-Corrole$^{3+}$, [MnB$V^{2-}$]$_2$, [MnBVDME]$_2$, [MnMBVDME]$_2$, and [MnBVD$T^{2-}$]$^2$.

As for the SODm, many materials has already been reported, but there are still many of SODm which have not yet been reported. Accordingly, the SODm applied to the electrolyte of the lithium secondary battery is not limited to the ones listed above, but is selected from those capable of being applied as a superoxide dismutase mimic catalyst (SODm).

Particularly, among the materials conventionally known as the superoxide dismutase mimic catalyst (SODm), any material having an electrochemical redox potential within a range of −450 mV to −50 mV, compared to that of a standard hydrogen electrode, or being stable within an operation voltage range of the lithium secondary battery of 2.0 V to 4.55 V (compared to the Li$^+$/Li potential), may be used without a particular limit.

The cathode includes a current collector and a cathode active material layer formed on the current collector and including a cathode active material.

The cathode active material may be a compound capable of reversibly intercalating and deintercalating lithium (a lithiated intercalation compound).

According to one aspect, the cathode active material may be an over-lithiated oxide cathode material or a Ni-rich cathode material.

The over-lithiated oxide cathode material may include, for example, a compound represented by Chemical Formula 3.

$Li_xNi_yMn_zCo_wO_2$ [Chemical Formula 3]

In Chemical Formula 3, 1<x≤2, 0<y≤1, 0<z≤1, and 0<w≤1.

Examples of the Ni-rich cathode material include a lithium nickel cobalt manganese oxide and a lithium nickel cobalt oxide.

For example, the Ni-rich cathode material may include 50 wt % to 70 wt % of nickel (Ni).

These compounds may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxy carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be disposed in a method having no adverse influence on properties of a cathode active material by using these elements in the compound. For example, the method may include any coating method (e.g., spray coating, dipping, etc.), but is not illustrated in more detail since it is well-known to those skilled in the related field.

The cathode active material may be included in an amount of 90 wt % to 98 wt % based on a total weight of the cathode active material layer.

In an embodiment of the present invention, the cathode active material layer may include a binder and a conductive material. Herein, the binder and the conductive material may be included in an amount of 1 wt % to 5 wt %, respectively, based on a total amount of the cathode active material layer.

The binder improves binding properties of cathode active material particles with one another and with a current collector, and examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The conductive material is included to provide electrode conductivity, and any electrically conductive material may be used as a conductive material unless it causes a chemical change, and examples of the conductive material may include: a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

The current collector may include Al, but is not limited thereto.

The anode includes a current collector and an anode active material layer formed on the current collector and including an anode active material.

The anode active material includes a lithium metal or an alloy of a lithium metal as a material capable of reversibly intercalating/deintercalating lithium ions.

The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn.

In the anode active material layer, the anode active material may be included in an amount of 95 wt % to 99 wt % based on the total weight of the anode active material layer.

In an embodiment of the present invention, the anode active material layer includes a binder, and optionally a conductive material. In the anode active material layer, a content of the binder may be 1 wt % to 5 wt % based on a total weight of the anode active material layer. When the anode active material layer further includes a conductive material, the anode active material layer includes 90 wt % to 98 wt % of the anode active material, 1 wt % to 5 wt % of the binder, and 1 wt % to 5 wt % of the conductive material.

The binder improves binding properties of anode active material particles with one another and with a current collector. The binder includes a non-water-soluble binder, a water-soluble binder, or a combination thereof.

The non-water-soluble binder may be selected from polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber-based binder or a polymer resin binder. The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof. The polymer resin binder may be selected from polytetrafluoroethylene, polyethylene, polypropylene, an ethylene-propylene copolymer, polyethylene oxide, polyvinylpyrrolidone, polyepichlorohydrin, polyphosphazene, polyacrylonitrile, polystyrene, an ethylene-propylene diene copolymer, polyvinylpyridine, chlorosulfonated polyethylene, latex, a polyester resin, an acrylic resin, a phenolic resin, an epoxy resin, polyvinyl alcohol, and a combination thereof.

When the water-soluble binder is used as an anode binder, a cellulose-based compound may be further used to provide viscosity. The cellulose-based compound includes one or more of carboxymethyl cellulose, hydroxypropyl methylcellulose, methyl cellulose, or alkali metal salts thereof. The alkali metals may be Na, K, or Li. Such a thickener may be included in an amount of 0.1 to 3 parts by weight based on 100 parts by weight of the anode active material.

The conductive material is included to provide electrode conductivity, and any electronically conductive material may be used as a conductive material unless it causes a chemical change in a battery, and examples of the conductive material include: a carbon-based material such as natural graphite, artificial graphite, carbon black, acetylene black, ketjen black, a carbon fiber, and the like; a metal-based material of a metal powder or a metal fiber including copper, nickel, aluminum silver, and the like; a conductive polymer such as a polyphenylene derivative; or a mixture thereof.

The current collector may include one selected from a copper foil, a nickel foil, a stainless steel foil, a titanium foil, a nickel foam, a copper foam, a polymer substrate coated with a conductive metal, and a combination thereof.

The lithium secondary battery may further include a separator between the cathode and the anode, depending on a type of the lithium secondary battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Hereinafter, the present invention will be described in more detail by examples and comparative examples.

However, the following examples are only for illustrating the present invention, and the content of the present invention is not limited to the following examples.

Example 1

(Preparation of Electrolyte)
1.3 M LiPF$_6$ salt was completely dissolved in a mixed solvent of ethylene carbonate (EC), ethyl methyl carbonate (EMC), and diethylene carbonate (DEC) (EC:EMC:DEC=a volume ratio of 2:5:3) to prepare an electrolyte so that MA-C$_{60}$ was 0.7 wt % based on a total weight of the electrolyte.

(Manufacture of Lithium Secondary Battery Cell)
The electrolyte was used to produce a lithium secondary battery cell.

$Li_{1.17}Ni_{0.17}Mn_{0.5}Co_{0.17}O_2$ as an over-lithiated cathode active material was mixed with $Li_2MnO_3 \cdot 0.6LiNi_{1/3}Co_{1/3}Mn_{1/3}O_2$ in a weight ratio of 6:4 to prepare a cathode active material, and the cathode active material: a binder (PVDF): a conductive material (Super P) in a weight ratio of 90:5:5 were uniformly mixed in an N-methyl-2-pyrrolidone (NMP) solvent.

The mixture was uniformly coated on an aluminum (Al) current collector, compressed with a roll press, and vacuum-dried at 120° C. in a vacuum oven for 1 hour to produce a cathode.

The obtained cathode as an operation electrode, a Li metal (700 μm) as a reference electrode, and a separator between the cathode and the Li metal were put in a battery case made of a polyethylene material, and the electrolyte was injected thereinto to produce a 2032 half-cell-type lithium secondary battery cell in a common manufacturing method.

Comparative Example 1

An electrolyte and a lithium secondary battery cell were manufactured according to the same method as Example 1, except that the MA-C$_{60}$ was not used.

Evaluation 1: Reactivity Evaluation of Superoxide in Electrolyte

Figure 2:
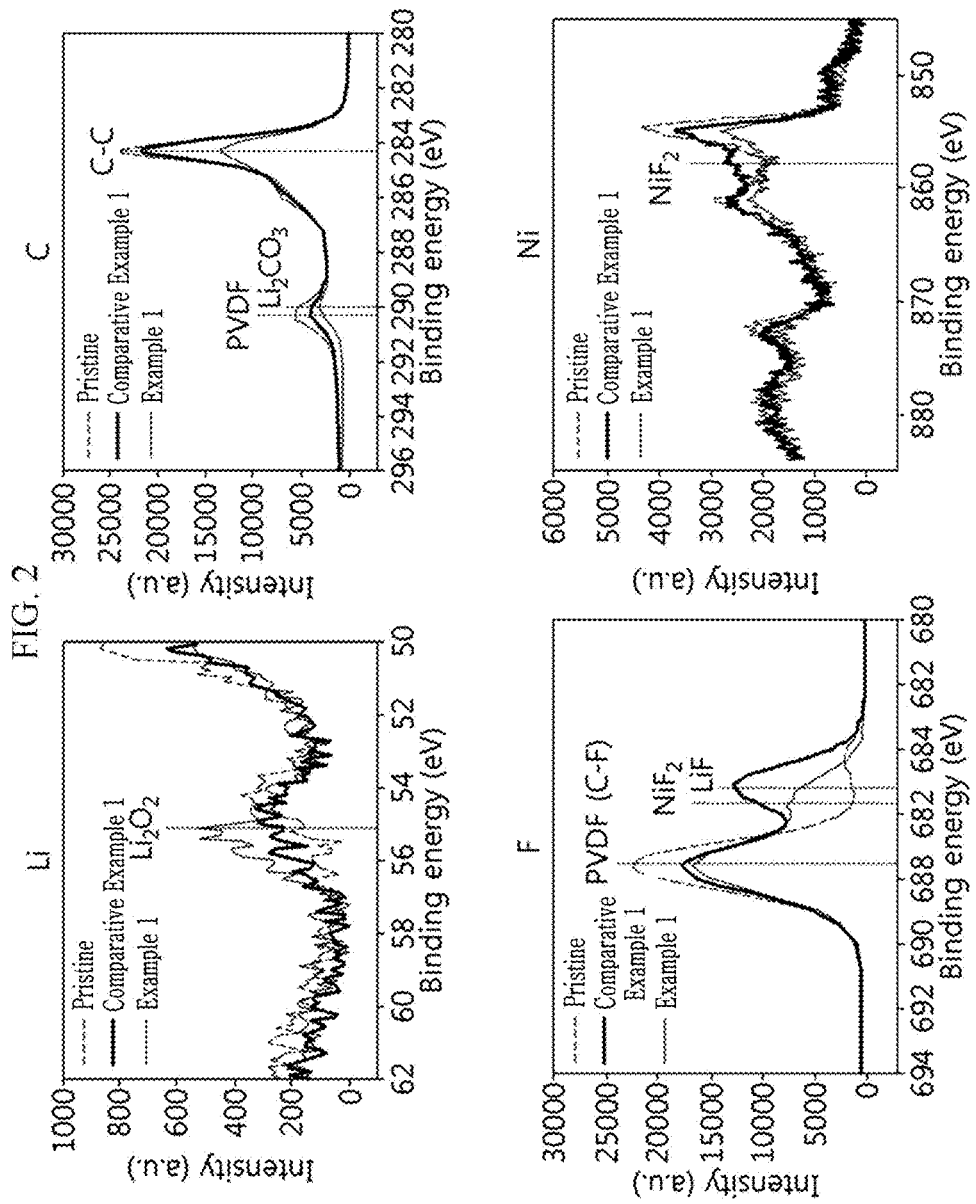
FIG. 2 shows XPS graphs of the secondary battery cell of Example 1 according to the present invention and the secondary battery cell of Comparative Example 1.

In order to evaluate reactivity of the electrolytes according to Example 1 and Comparative Example 1, the lithium secondary battery cells according to the example and the comparative example were charged and discharged within 4.5 V to 2 V at a charge-discharge rate of 1 C for 100 cycles to analyze chemical species included in the electrolytes through an XPS analysis of the corresponding surfaces of the cathodes, and the results are shown in FIG. 2.

FIG. 2 shows XPS graphs of the secondary battery cell of Example 1 according to the present invention and the secondary battery cell of Comparative Example 1.

Referring to FIG. 2, compared with the secondary battery cell including no MA-C$_{60}$ according to Comparative Example 1, as for the secondary battery cell of Example 1 manufactured by using the electrolyte including MA-C$_{60}$ according to an embodiment of the present invention, an amount of side-reaction products such as $Li_2CO_3$, LiOH, LiF, and the like was greatly reduced, and formation of $Li_2O_2$ was promoted.

A superoxide ($O_2^{\bullet-}$), which was generated as the cathode was activated, reacted with MA-C$_{60}$ and formed $Li_2O_2$, and the $Li_2O_2$ in a solid state formed a $Li_2O_2$ film on the surface of the cathode. The formed $Li_2O_2$ film suppressed the superoxide ($O_2^{\bullet-}$) generated as the cathode was activated from being dissolved in the electrolyte and contributed to improving performance of the high-capacity secondary battery cell.

Evaluation 2: Confirmation of Structural Changes of Cathode

Figure 3:
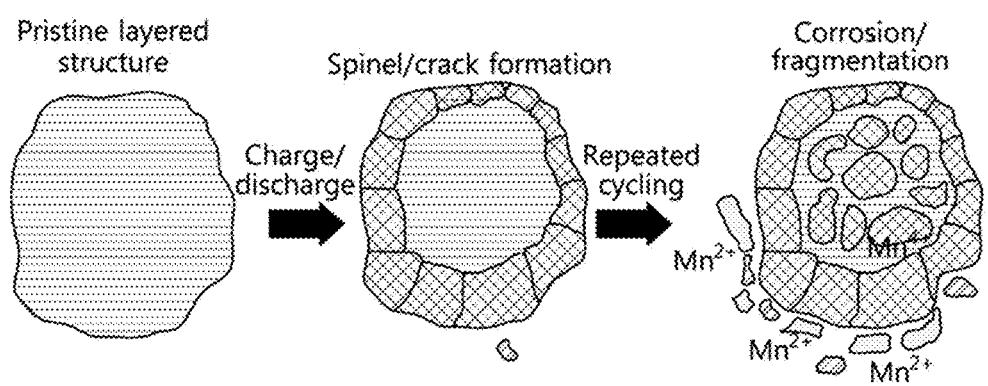
FIG. 3 is a view for explaining changes in the cathodes according to the charge/discharge of the secondary battery cell of Example 1 according to the present invention and the secondary battery cell of Comparative Example 1.
Figure 3:
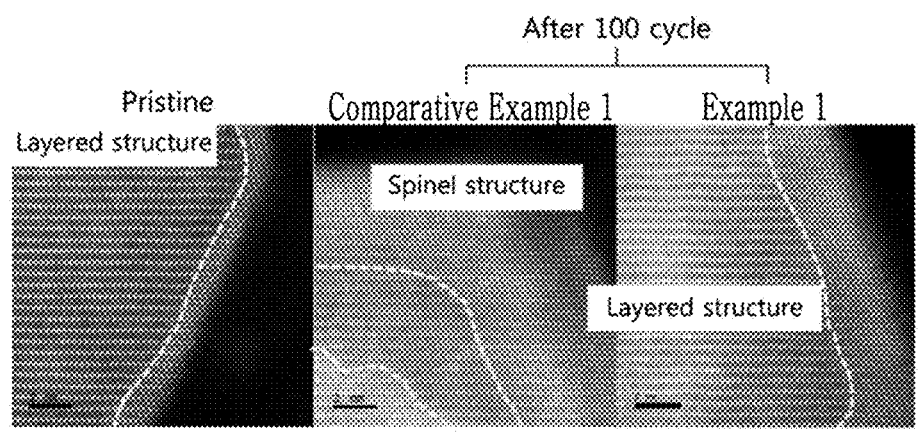

In order to evaluate reactivity of the electrolytes according to Example 1 and Comparative Example 1, the lithium secondary battery cells according to Example 1 and Comparative Example 1 were charged and discharged within 4.5 V to 2 V at a charge and discharge rate of 1 C for 100 cycles, and then surface images of the cathodes were captured by using a transmission electron microscope (TEM) to examine surface structure changes of the cathodes, and the results are shown in FIG. 3.

FIG. 3 is a view for explaining changes in the cathodes according to the charge/discharge of the secondary battery cell of Example 1 according to the present invention and the secondary battery cell of Comparative Example 1.

Referring to FIG. 3(a), as for a high-capacity secondary battery cell including a cathode material having a layered structure, a spinel/crack structure was formed on the surface of a cathode according to charges and discharges. Accordingly, the cathode was corroded and led to performance deterioration of the secondary battery cell.

FIG. 3(b) is a TEM image of the cathode active material according to charges/discharges. Referring to FIG. 3(b), the secondary battery cell of Example 1 manufactured by applying the electrolyte including MA-$C_{60}$ according to an example embodiment of the present invention maintained an initial layered structure even after the charge and discharge cycles. The reason is that the $Li_2O_2$ film including the MA-$C_{60}$ on the surface of the cathode suppressed formation of a spinel structure during the charge, resultantly realizing a high-capacity secondary battery having excellent charge and discharge characteristics.

Evaluation 3: Confirmation of Structural Changes of Anode

Figure 4:
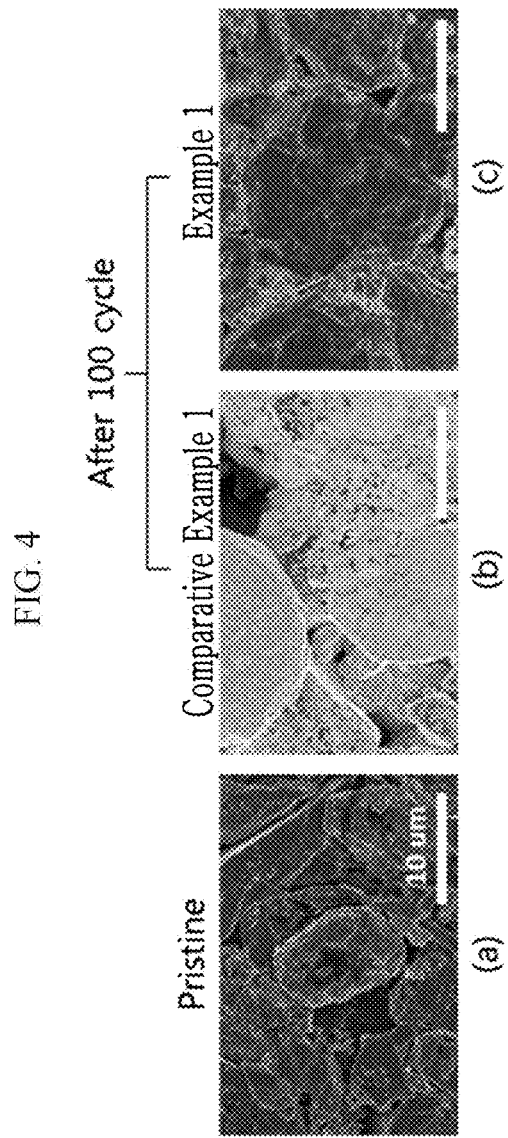
FIG. 4 is a view for explaining changes in the cathodes according to the charge/discharge of the secondary battery cell of Example 1 according to the present invention and the secondary battery cell of Comparative Example 1.

In order to examine surface structure changes of the anodes according to Example 1 and Comparative Example 1, scanning electron microscope (SEM) images thereof were taken, and are provided in FIG. 4.

FIG. 4 is a view for explaining changes in the cathodes according to the charge/discharge of the secondary battery cell of Example 1 according to the present invention and the secondary battery cell of Comparative Example 1. More specifically, FIGS. 4(a), (b), and (c) are SEM images of the anodes according to charge/discharge.

Referring to FIGS. 4(a), (b), and (c), the anode of the secondary battery cell of Example 1 manufactured by the electrolyte including MA-$C_{60}$ according to an example embodiment of the present invention maintained an initial shape even after the charge and discharge cycles, but the anode of the secondary battery cell of Comparative Example 1 including no MA-$C_{60}$ exhibited deposition of a transition metal on the surface after the 100 cycles. The reason is that the $Li_2O_2$ film on the surface of the cathode suppressed a transition metal generated from the cathode from being dissolved in the electrolyte due to the MA-$C_{60}$ during the charge.

Evaluation 4: Evaluation of Initial Charge/Discharge Characteristics

Figure 5:
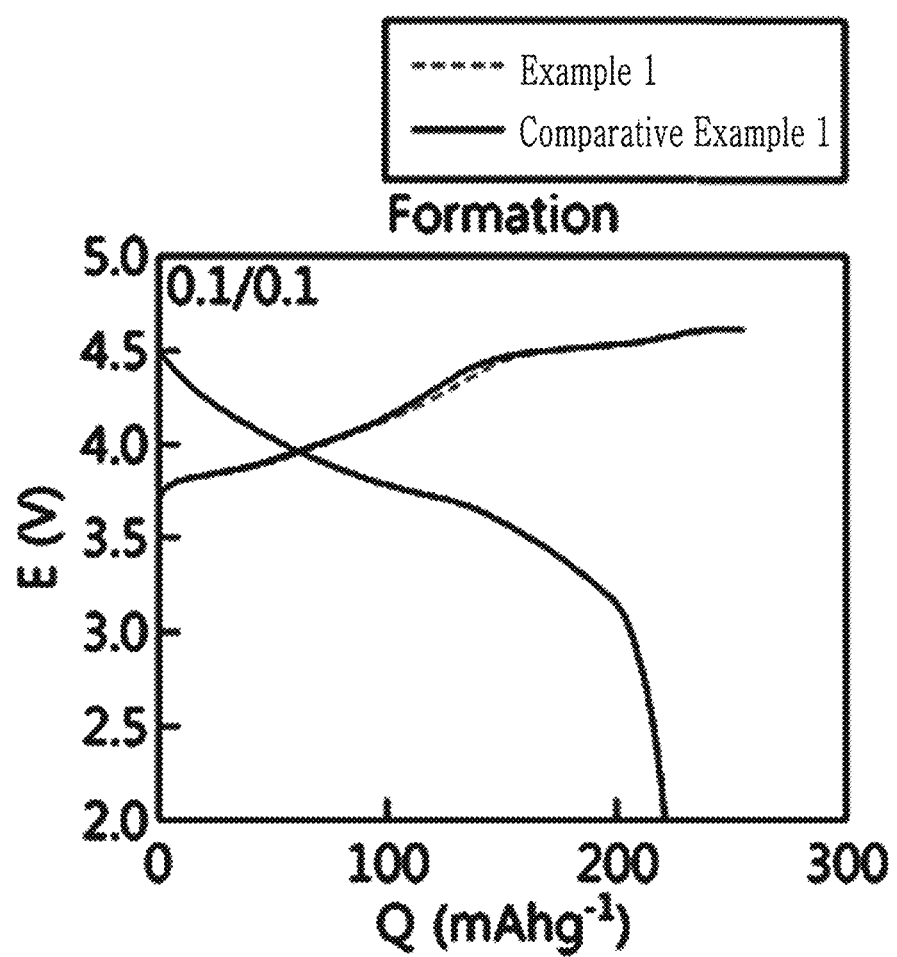
FIG. 5 is a graph for comparing initial charge and discharge characteristics of the secondary battery cell of Example 1 according to the present invention and the secondary battery cell of Comparative Example 1.

The secondary battery cells according to Example 1 and Comparative Example 1 were charged-discharged at room temperature (25° C.), and then voltage profiles thereof were determined and are shown in FIG. 5.

The charge and discharge were performed at current density of 0.1 C, and an upper voltage of the charge was 4.55 V (vs. Li/$Li^+$), while a lower voltage of the discharge was 2.0 V (vs. Li/$Li^+$).

FIG. 5 is a graph for comparing initial charge and discharge characteristics of the secondary battery cell of Example 1 according to the present invention and the secondary battery cell of Comparative Example 1.

Referring to FIG. 5, the secondary battery cell of Example 1 was charged at a much lower overcharge within 4.0 V to 4.5 V during the initial charge and discharge, and thus had high energy efficiency compared with that of the secondary battery cell of Comparative Example 1.

Evaluation 5: Evaluation of Cycle-Life Characteristics of Half-Cells

Figure 6:
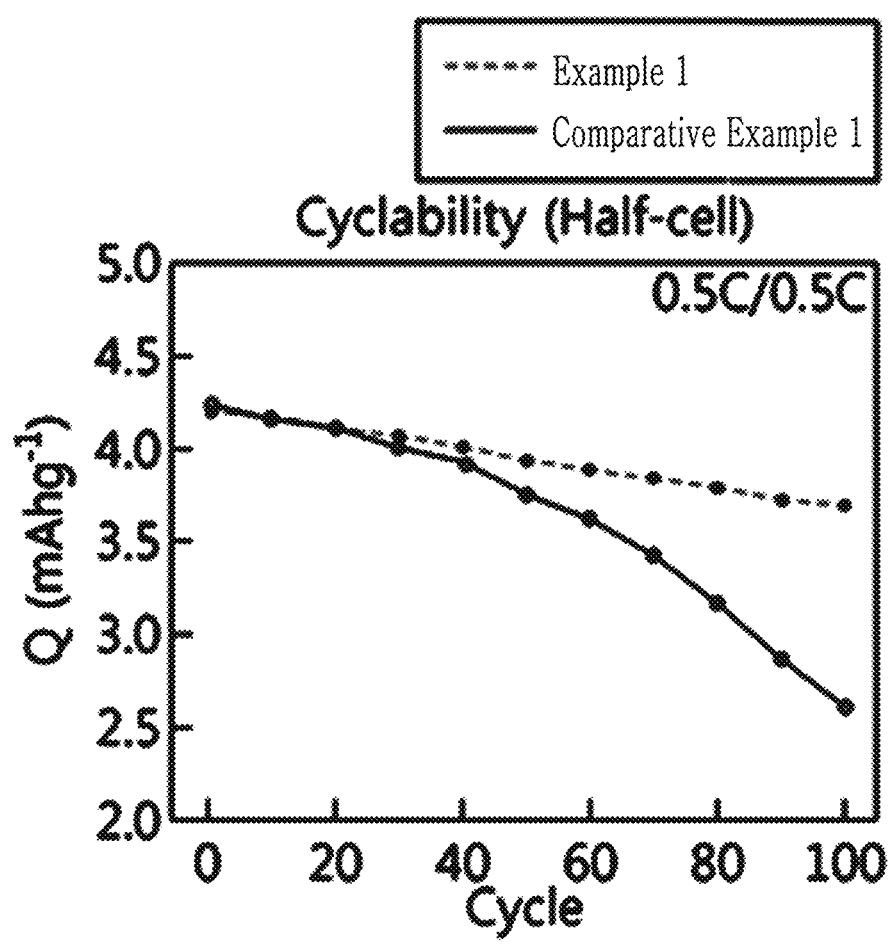
FIG. 6 is a graph for comparing cycle-life characteristics of the half-cells of Example 1 according to the present invention and Comparative Example 1.

Discharge capacity of the half-cells according to Example 1 and Comparative Example 1 depending on the number of cycles is shown in FIG. 6. Charge and discharge of the cells were performed for 100 cycles in total in a potential range of 3.0 V to 4.5 V at a current density of 150 mA/g.

FIG. 6 is a graph for comparing cycle-life characteristics of the half-cells of Example 1 according to the present invention and Comparative Example 1.

Referring to FIG. 6, the secondary battery cell of Example 1 exhibited no capacity deterioration as cycles progressed and maintained high capacity, but the secondary battery cell of Comparative Example 1 exhibited capacity deterioration as cycles progressed.

Figure 7:
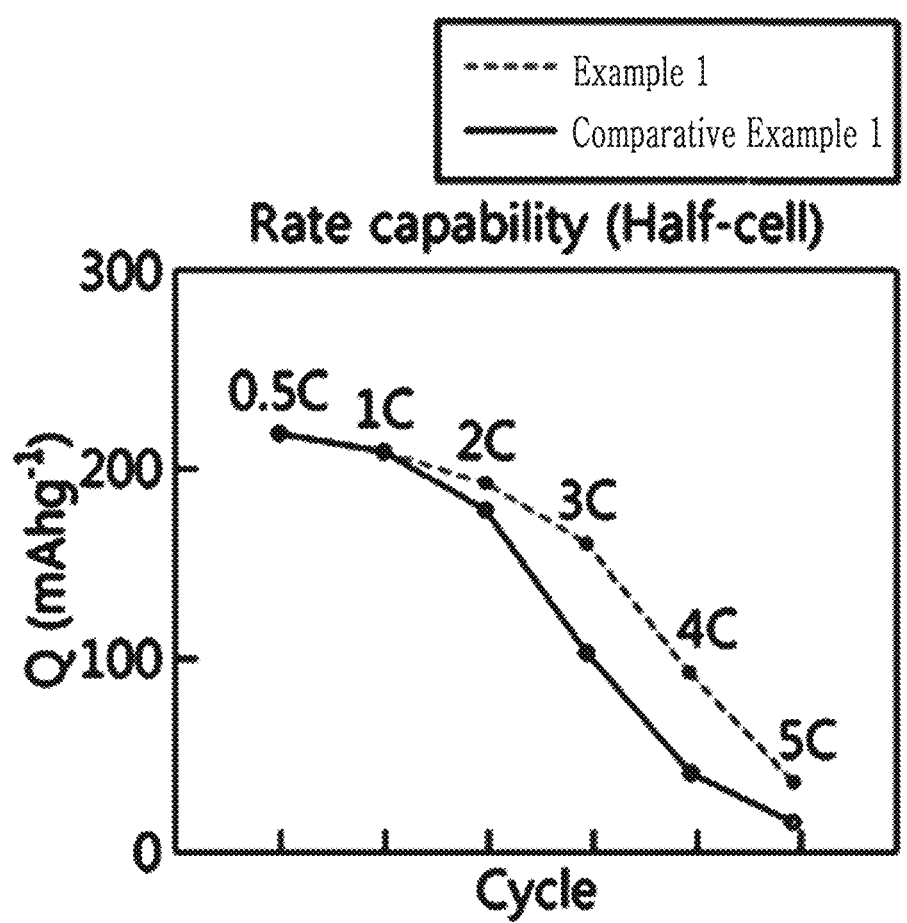
FIG. 7 is a graph for comparing discharge capacity changes according to the rates of the half-cells of Example 1 according to the present invention and Comparative Example 1.

Evaluation 6: Measurement of Discharge Capacity Changes According to the Number of Cycles of Half-Cells Discharge capacity changes of the half-cells according to Example 1 and Comparative Example 1 depending on a rate are shown in FIG. 7. Herein, the charge was performed up to 4.6 V, and the discharge was performed down to 2 V at each current density of 0.5 C (125 mA/g), 1 C (250 mA/g), 2 C (500 mA/g), 3 C (750 mA/g), 4 C (1000 mA/g), and 5 C (1250 mA/g). At each rate, 5 cycles were performed.

FIG. 7 is a graph for comparing discharge capacity changes according to the rates of the half-cells of Example 1 according to the present invention and Comparative Example 1.

Referring to FIG. 7, as an experiment result of increasing a C-rate (i.e., a discharge rate), the half-cell of Example 1 exhibited excellent rate capability compared with that of the half-cell of Comparative Example 1.

Evaluation 7: Evaluation of Cycle-Life Characteristics of Full-Cells

Figure 8:
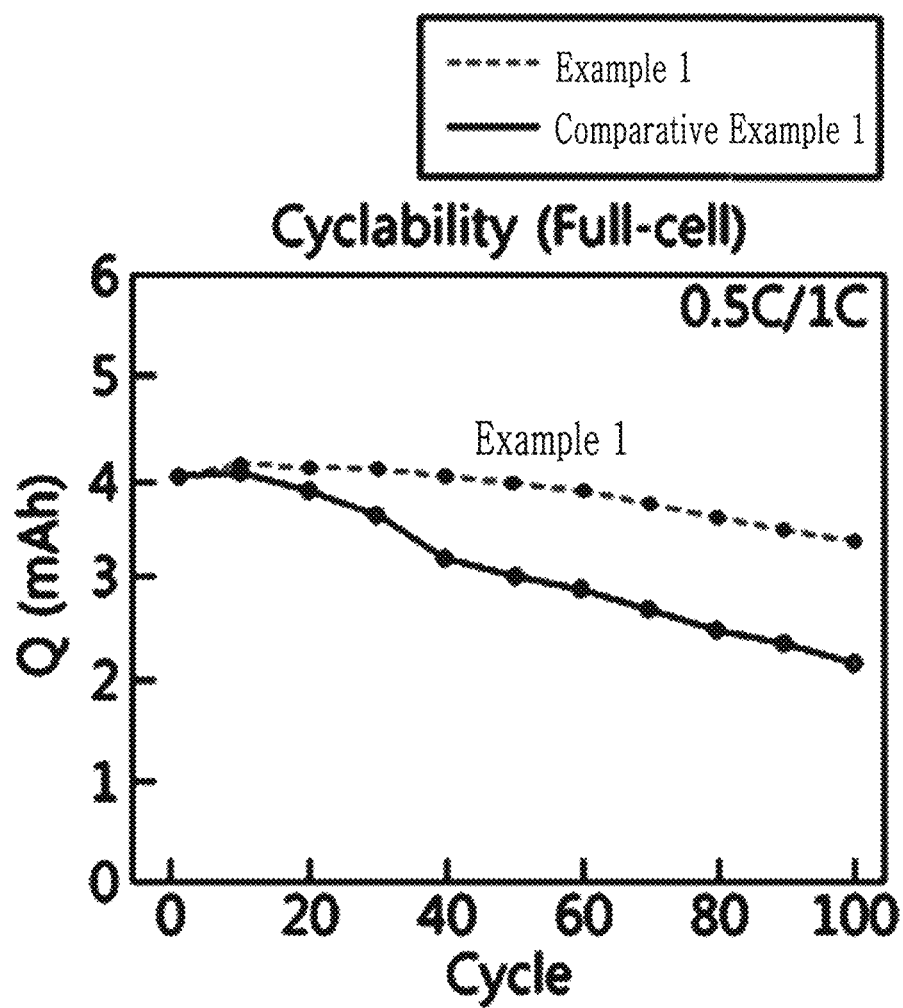
FIG. 8 is a graph for comparing cycle-life characteristics of the full-cells of Example 1 according to the present invention and Comparative Example 1.

Discharge capacity of the full-cells according to Example 1 and Comparative Example 1 depending on the number of cycles is shown in FIG. 8. Charges and discharges of the cells were performed for 100 cycles in total within a potential range of 2.0 V to 4.5 V at a current density of 250 mA/g.

FIG. 8 is a graph for comparing cycle-life characteristics of the full-cells of Example 1 according to the present invention and Comparative Example 1.

Referring to FIG. 8, a discharge capacity difference of the cells was much increased during the 100 cycles.

Although the preferred embodiments of the present invention have been described through the above, the present invention is not limited thereto, and can be implemented by various modifications within the scope of the claims and detailed description of the invention and the accompanying drawings, which also fall within the scope of the present invention.

What is claimed is:

1. A secondary battery, comprising
   a cathode comprising an over-lithiated oxide cathode material or a Ni-rich cathode material;
   a lithium anode; and
   an electrolyte comprising a superoxide dismutase mimic catalyst (SODm),
   wherein the superoxide dismutase mimic catalyst (SODm) comprises at least one selected from MA-$C_{60}$, honokiol, Mn texaphyrin, MnTrM-2-Corrole$^{3+}$, [MnBV$^{2-}$]$_2$, [MnBVDME]$_2$, [MnMBVDME]$_2$, and [MnBVDT$^{2-}$]$_2$.

2. The secondary battery of claim 1, wherein the superoxide dismutase mimic catalyst (SODm) serves to convert a superoxide ($O_2^{\bullet-}$) that is generated as the cathode is activated upon charging into $Li_2O_2$.

3. The secondary battery of claim 1, wherein the superoxide dismutase mimic catalyst serves to suppress side reactions of a superoxide ($O_2^{\bullet-}$) that are generated as the cathode is activated upon charging.

4. The secondary battery of claim 1, wherein the superoxide dismutase mimic catalyst serves to inhibit production of at least one side-reaction product selected from $Li_2CO_3$, LiOH, LiF, $CO_2$, $C_2O_6^{2-}$, $H_2O$, $O_2$, and CO upon charging.

5. The secondary battery of claim 1, which further comprises a $Li_2O_2$ film formed at an interface between the cathode and the electrolyte.

6. The secondary battery of claim 5, wherein the $Li_2O_2$ film serves to inhibit a transition metal generated from the cathode from being dissolved in the electrolyte.

7. The secondary battery of claim 5, wherein the $Li_2O_2$ film serves to inhibit the superoxide ($O_2^{\bullet-}$) generated as the cathode is activated from being dissolved in the electrolyte.

8. The secondary battery of claim 1, wherein the superoxide dismutase mimic catalyst (SODm) comprises: at least one of an organic compound comprising at least one functional group of a carboxyl group, a polyphenol group, and a hydroxyl group; a free radical compound comprising at least one functional group of a carboxyl group, a polyphenol group, and a hydroxyl group; a metal complex comprising at least one functional group of a carboxyl group, a polyphenol group, and a hydroxyl group; and a metal oxide comprising at least one functional group of a carboxyl group, a polyphenol group, and a hydroxyl group.

9. The secondary battery of claim 1, wherein the superoxide dismutase mimic catalyst (SODm) is included in an amount of 0.1 wt % to 1 wt % based on a total weight of the electrolyte.

* * * * *